Dec. 25, 1962    R. L. KINDRED ETAL    3,069,896
FLUID ANALYZER CIRCUITS
Filed June 20, 1958
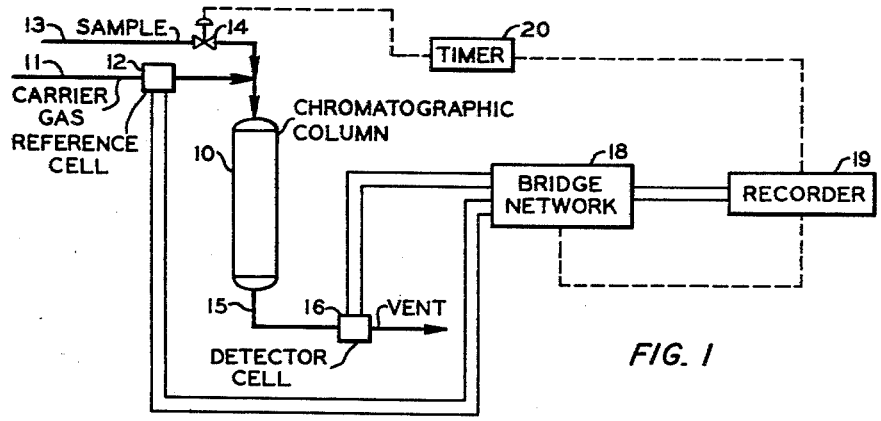
FIG. 1
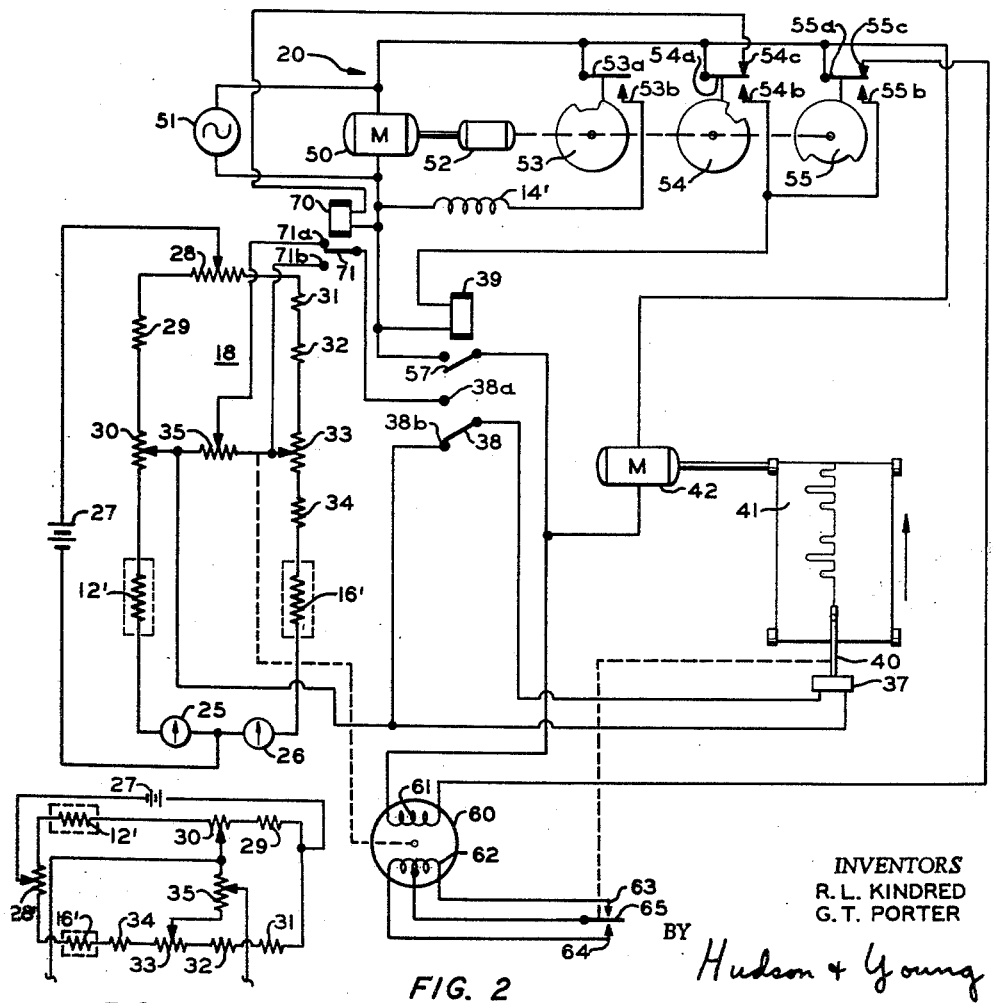
FIG. 2
FIG. 3
INVENTORS
R. L. KINDRED
G. T. PORTER
BY Hudson & Young
ATTORNEYS United States Patent Office
3,069,896
Patented Dec. 25, 1962

3,069,896
FLUID ANALYZER CIRCUITS
Raymond L. Kindred and Grady T. Porter, Bartlesville, Okla., assignors to Phillips Petroleum Company, a corporation of Delaware
Filed June 20, 1958, Ser. No. 743,400
10 Claims. (Cl. 73—23)

This invention relates to the analysis of fluid streams by means of elution chromatography. In another aspect it relates to improved electrical bridge networks.

In various industrial and laboratory operations, there is a need for analysis procedures which are capable of measuring small concentrations of constituents in fluid mixtures. One analysis procedure which presently is becoming quite valuable for fluid analysis involves elution chromatography. In elution chromatography, a sample of the material to be separated is introduced into a column which contains a selective adsorbent. A carrier gas is directed into the column so as to tend to force the sample material through the column. The adsorbent attempts to hold the constituents of the sample, whereas the stripping gas tends to pull them through the column. This results in the several constituents of the fluid mixture traveling through the column at different rates of speed, depending upon their affinities for the packing material. The column effluent thus consists initially of the carrier gas alone, the individual constituents of the fluid mixture appearing at later spaced time intervals. It is common practice to detect these constituents by means of a thermal conductivity analyzer which compares the thermal conductivity of the effluent gas with the thermal conductivity of the carrier gas directed to the column.

The thermal conductivity analyzers often employ temperature sensitive resistance elements to compare the thermal conductivities of the two gases. These resistance elements are disposed in the flows of the gases so that the resistances of the elements are functions of the thermal conductivities of the gases. The resistance elements usually are connected into a modified form of Wheatstone bridge network in order to provide a comparison of the resistances of the two elements. The resistance elements preferably are formed of semi-conducting materials such as mixtures of metallic oxides and sulfides which have extremely high negative temperature coefficients of resistance. Such elements generally are referred to as "thermistors."

It has been discovered that the rate of aging of thermistors, the changing of initial characteristics with time, is a function of the current through the thermistors. Thus, any appreciable difference in current through the individual thermistors of a bridge network causes a continuous drift in one direction of the output signal from the bridge. In accordance with the present invention, an improved thermistor bridge network is provided which can be adjusted so that currents through the thermistors in the two legs of the bridge are substantially equal. This provides equal aging of both thermistors. The bridge network of this invention is also constructed so that there is negligible interaction between the current adjusting means and the means provided to establish an initial balance condition in the bridge. Novel apparatus is also provided in accordance with this invention for adjusting the bridge automatically at predetermined time intervals to establish an initial balanced condition.

Accordingly, it is an object of this invention to provide improved apparatus for analyzing fluid mixtures by means of elution chromatography.

Another object is to provide a novel electrical bridge network for comparing the resistances of circuit elements.

A further object is to provide novel apparatus for balancing electrical bridge networks automatically.

Other objects, advantages and features of this invention should become apparent from the following detailed description which is taken in conjunction with the accompanying drawing in which:

FIGURE 1 is a schematic representation of an elution chromatographic analyzer having the bridge network of the present invention incorporated therein.

FIGURE 2 is a schematic circuit drawing of the bridge network, timer and recorder of FIGURE 1.

FIGURE 3 illustrates a second embodiment of the bridge network.

Referring now to the drawing in detail and to FIGURE 1 in particular, there is shown a column 10 which contains material that selectively retards the passage therethrough of the constituents of a fluid mixture to be analyzed. This column preferably can be filled with an adsorption material, such as a molecular sieve material comprising a dehydrated zeolite, silica gel, or alumina, or with an inert crushed solid coated by a solvent such as hexadecane or benzyl ether. Any material which selectively retards passage of the constituents of a fluid mixture to be analyzed can be employed as the packing material in this column. A carrier gas is introduced into the first end of column 10 through a conduit 11 which has a reference analyzer cell 12 disposed therein. Examples of carrier gases which can be employed include: helium, hydrogen, nitrogen, argon, carbon dioxide, air and steam. The particular carrier gas employed and the packing material employed in the column depend to a large extent upon the composition of the fluid mixture to be analyzed. A sample of the fluid mixture to be analyzed is introduced into the first end of column 10 through a conduit 13 which has a control valve 14 therein. The effluent from column 10 is removed through a conduit 15 which has a detector cell 16 disposed therein.

Cells 12 and 16 are thermal conductivity cells which have thermistors disposed therein in thermal contact with the gas which flows through the cells. The thermistors within these cells are connected into an electrical bridge network 18 which applies an output signal to a recorder 19 that is representative of the diffeernce between the resistances of the two thermistors. Valve 14 is opened periodically by means of a timer 20 to introduce predetermined volumes of the sample fluid mixture into column 10. Timer 20 also controls recorder 19 so that the recorder is energized only during the time that the actual analysis is made. Recorder 19 operates to rebalance bridge network 18 periodically in the manner described in detail hereinafter.

Bridge network 18 is illustrated in detail in FIGURE 2. Thermistors 12' and 16' in this network represent the temperature sensitive resistance elements in respective cells 12 and 16 of FIGURE 1. The first terminal of thermistor 12' is connected to the first terminal of thermistor 16' through series connected current indicators 25 and 26. The junction between indicators 25 and 26 is connected to the negative terminal of a direct current voltage source 27 which preferably is a regulated power supply circuit. The positive terminal of voltage source 27 is connected to the contactor of a potentiometer 28. The first end terminal of potentiometer 28 is connected to the second terminal of thermistor 12' through a resistor 29 and a potentiometer 30 which are connected in series relationship. The second end terminal of potentiometer 28 is connected to the second terminal of thermistor 16' through resistors 31 and 32, a potentiometer 33 and a resistor 34 which are connected in series relationship. The contactors of potentiometers 30 and 33 are connected to the respective end terminals of a potentiometer 35.

The contactor of potentiometer 30 is connected to the first input terminal of a recorder pen arm actuator 37.

The contactor of potentiometer 35 is connected to a terminal 71a which is engaged by a switch 71 when a relay 70 is energized. Switch 71 is connected to a terminal 38a which is engaged by a switch 38 when a relay 39 is energized. Switch 38 is connected to the second input terminal of actuator 37. When relay 39 is deenergized, switch 38 engages a terminal 38b which is connected to the first input terminal of actuator 37. Actuator 37 has a pen arm 40 associated therewith which is displaced laterally of the direction of movement of a chart 41 by an amount representative of amplitude of the signal applied to the recorder from bridge network 18. Conventional recording instruments available commercially can be employed in this manner. Chart 41 is driven by a constant speed motor 42. When relay 70 is deenergized, switch 71 engages a terminal 71b which is connected to the contactor of potentiometer 33.

In one specific embodiment of the bridge network of this invention, the following circuit components were employed:

| Element: | Resistance (ohms) |
|---|---|
| 29 | 600 |
| 31 | 600 |
| 32 | 20 |
| 34 | 20 |
| 33 | 10 |
| 30 | 50 |
| 28 | 100 |
| 35 | 1,000 |

Voltage source 27 provided 8 volts. Thermistors 12' and 16' each had a resistance of approximately 600 ohms at the normal operating conditions with carrier gas flowing past each.

Bridge network 18 can be balanced initially when only carrier gas is directed through column 10. The resistances of thermistors 12' and 16' are then equal if these elements are of the same construction. The bridge network is adjusted alternately by means of potentiometers 28 and 30 so that the output signal applied to the recorder is zero. Potentiometer 28 is adjusted until there is an equal flow of current through thermistors 12' and 16' as indicated by current meters 25 and 26. The bridge network is then in an initial state of balance. Potentiometer 35 provides a means for adjusting the sensitivity of the recorder.

Timer 20 comprises a constant speed motor 50 which is energized by a source of alternating current 51. The drive shaft of motor 50 is connected through a gear train 52 to rotate cams 53, 54 and 55 at a predetermined speed. Switch 53a, 54a and 55a are associated with respective cams 53, 54 and 55 so as to engage respective contacts 53b, 54b and 55b when notches of the cams are adjacent the switches. Switches 54a and 55a engage respective contacts 54c and 55c when notches in respective cams 54 and 55 are not adjacent the switches. Switches 53a, 54a and 55a are connected to the first terminal of current source 51. Contact 53b is connected to the second terminal of current source 51 through a solenoid 14' which opens valve 14 when energized. Cam 53 is provided with a notch shaped so that solenoid 14' is energized for a short period of time in the beginning of the analysis cycle. This introduces a predetermined volume of the sample mixture to be analyzed into column 10. Contact 54c is connected to the second terminal of current source 51 through relay 70. Contact 54b is connected to the second terminal of current source 51 through relay 39. Contact 55b is also connected to the second terminal of current source 51 through relay 39. The first terminal of current source 51 is connected to the first terminal of motor 42, and the second terminal of motor 42 is connected to the second terminal of current source 51 through a switch 57 which is closed when relay 39 is energized.

The drive shaft of a shaded-pole, reversible motor 60 is mechanically connected to the contactor of potentiometer 33. The first terminal of the first coil 61 of motor 60 is connected to contact 55c, and the second terminal of motor coil 61 is connected to the second terminal of current source 51 through switch 57. One end terminal of the second coil 62 of motor 60 is connected to a contact 63, and the second end terminal of motor coil 62 is connected to a contact 64 which is spaced from contact 63. A switch 65 is disposed between contacts 63 and 64 so as to engage these contacts selectively. Switch 65 is connected electrically to the center tap of motor coil 62 and is connected mechanically to recorder pen 40. The mechanical connection between switch 65 and recorder pen 40 is such that switch 65 remains between contactors 63 and 64 when pen arm 40 is at the "zero" point on chart 41. If pen 40 is deflected in a first direction, switch 65 engages contact 63. If pen 40 is deflected in a second direction, switch 65 engages contact 64.

Prior to the valve switching for the introduction of a sample, cam 54 moves switch 54a into engagement with contact 54b for a short time interval. This results in relay 39 being energized so that switch 57 is closed and switch 38 engages terminal 38a. This results in the full output signal from bridge network 18 being applied to recorder actuator 37 because relay 70 is deenergized. The closure of switch 57 results in chart motor 42 being energized. At this time, the carrier gas alone is flowing through both cells 12 and 16. The bridge network should be in a state of electrical balance. However, if the bridge network is not in such a state of balance, recorder pen 40 is deflected in one direction or the other. This results in switch 65 engaging one of the contacts 63 and 64. Engagement of contact 63 results in one-half of motor coil 62 being shorted so that motor 60 is rotated in a first direction. If switch 65 engages contact 64, the second half of motor coil 62 is shorted so that motor 60 rotates in the opposite direction. The mechanical connection between motor 60 and the contactor of potentiometer 33 is such that the contactor is moved in a direction to balance the bridge network to return pen arm 40 to the "zero" point.

At a later time in the analysis cycle, the individual constituents of the fluid mixture to be analyzed appear in the effluent from column 10. Cam 55 is designed so that switch 55a moves into engagement with contact 55b during this period. This also energizes relay 39 to close switch 57 and to move switch 38 into engagement with terminal 38a. However, switch 55a is no longer in engagement with contact 55c so that motor coil 61 is deenergized. This prevents movement of the contactor of potentiometer 33 during the actual analysis period. Motor 42 drives chart 41, and the output signal from the bridge network displaces recording pen 40. This provides a record of the differences between the thermal conductivities of the gases flowing through cells 12 and 16.

The cams of timer 20 are designed so that sufficient time is provided to purge column 10 between individual analysis periods. If necessary, a purge gas from an auxiliary source can be directed through column 10 at this time to speed the purge period. The cams of timer 20 are designed so that the sample gas is introduced into the column as soon as possible after the purge period to provide a second analysis.

In FIGURE 3 there is shown a modified form of the bridge network. The network of FIGURE 3 is similar to the network of FIGURE 2 except that a potentiometer 28' is connected between thermistors 12' and 16', and the corresponding potentiometer 28 is removed. The positive terminal of voltage source 27 is connected to the junction between resistors 29 and 31, and the negative terminal of voltage source 27 is connected to the contactor of potentiometer 28'.

The initial balance is made by positioning the contactors of potentiometers 30 and 33 at the respective midpoints thereof. Potentiometer 28' is adjusted until the recorder indicates zero. This means that the potentials at the contactors of potentiometers 30 and 33 are the same. Since the resistance between the positive terminal of voltage source 27 and the contactor of potentiometer 30 is equal to the resistance between the positive terminal of voltage source 27 and the contactor of potentiometer 33, the current through thermistor 12' is equal to the current through thermistor 16'. This simplifies the initial balancing of the bridge.

From the foregoing description, it should be evident that there is provided in accordance with this invention an improved bridge network and timing mechanism for use with a chromatographic analyzer. It should also be evident that the bridge network of this invention can be employed in other types of analysis instruments. For example, the two thermistors can be positioned to receive radiation beams in optical analyzers, such as those utilizing infrared radiation. The two thermistors can also be employed in instruments such as thermal flow meters.

While this invention has been described in conjunction with present preferred embodiments, it should be evident that it is not limited thereto.

What is claimed is:

1. Analysis apparatus comprising a bridge network having at least one impedance element therein which is adapted to be varied in accordance with a variable to be measured, a first voltage source applied across first opposite terminals of said bridge network, voltage indicating means including an arm adapted to be deflected in accordance with the voltage to be measured, means connecting said voltage indicating means across second opposite terminals of said bridge network, said bridge network including a second variable impedance element, a shaded-pole reversible motor having first and second coils, an alternating voltage source, switching means to apply said alternating voltage source selectively across said first coil, means responsive to deflection of said arm in a first direction from a reference point to connect the center of said second coil to the first end thereof, means responsive to deflection of said arm in a second direction from said reference point to connect the center of said second coil to the second end thereof, means connecting the drive shaft of said motor to said scond variable impedance element to adjust same in response to rotation of said motor and timing means to control said switching means so that said alternating voltage source is applied across said first coil prior to the time said at least one impedance element is affected by a property of the material under analysis and said alternating voltage source is thereafter removed from said first coil prior to the time said at least one impedance element is affected by said property.

2. Analysis apparatus comprising a bridge network having first and second temperature sensitive resistance elements positioned therein, at least one of said elements being adapted to be varied in accordance with a variable to be measured; a first voltage source having first and second terminals; means connecting said first terminal of said first voltage source to the respective first terminals of said first and second elements; first, second and third potentiometers; means connecting terminals of said first and second elements; means connecting the second terminal of said first voltage source to the contactor of said second potentiometer; a fourth potentiometer connected between the contactors of said first and third potentiometers; voltage indicating means including an arm adapted to be deflected in accordance with the voltage to be measured; means connecting said voltage indicating means between the contactors of said first and third potentiometers; a shaded-pole reversible motor having first and second coils; an alternating voltage source; switching means to apply said alternating voltage source selectively across said first coil; means responsive to deflection of said arm in a first direction from a reference point to connect the center of said second coil to the first end thereof; means responsive to deflection of said arm in a second direction from said reference point to connect the center of said second coil to the second end thereof; and means connecting the drive shaft of said motor to the contactor of said first potentiometer to adjust same in response to rotation of said motor.

3. Analysis apparatus comprising a bridge network having first and second temperature sensitive resistance elements, at least one of said elements being adapted to be varied in accordance with a variable to be measured; a first voltage source having first and second terminals; a first potentiometer connected between the first terminals of said first and second elements; means connecting the first terminal of said first voltage source to the contactor of said first potentiometer; second and third potentiometers; means connecting said second and third potentiometers in series between the second terminals of said first and second elements, means connecting the second terminal of said first voltage source between said second and third potentiometers; a fourth potentiometer connected between the contactors of said second and third potentiometers; voltage indicating means including an arm adapted to be deflected in accordance with the voltage to be measured; means connecting said voltage indicating means between the contactors of said third and fourth potentiometers; a shaded-pole reversible motor having first and second coils; an alternating voltage source; switching means to apply said alternating voltage source selectively across said first coil; means responsive to deflection of said arm in a first direction from a reference point to connect the center of said second coil to the first end thereof; means responsive to deflection of said arm in a second direction from said reference point to connect the center of said second coil to be second end thereof; and means for connecting the drive shaft of said motor to the contactor of said second potentiometer to adjust same in response to rotation of said motor.

4. Analysis apparatus comprising a bridge network having at least one impedance element therein which is adapted to be varied in accordance with a variable to be measured, a first voltage source applied across first opposite terminals of said bridge network, voltage indicating means including an arm adapted to be deflected in accordance with the voltage to be measured, means connecting said voltage indicating means across second opposite terminals of said bridge network, said bridge network including a second variable impedance element, a shaded-pole reversible motor having first and second coils, an alternating voltage source, switching means to apply said alternating voltage source selectively across said first coil, first and second spaced terminals connected to the respective ends of said second coil, a switch positioned adjacent said terminals and connected to the center of said second coil, means connecting said switch to said arm so that said switch engages said first terminal when said arm is deflected from a reference point in a first direction and engages said second terminal when said arm is deflected from said reference point in a second direction, means connecting the drive shaft of said motor to said second variable impedance element to adjust same in response to rotation of said motor and timing means to control said switching means so that said alternating voltage source is applied across said first coil prior to the time said at least one impedance element is affected by a property of the material under analysis and said alternating voltage source is thereafter removed from said first coil prior to the time said at least one impedance element is affected by said property.

5. Analysis apparatus comprising a chromatographic column, first conduit means communicating with one end of said column to introduce a carrier gas, a first temperature sensitive impedance element disposed in said first conduit means, a second temperature sensitive impedance element, second conduit means communicating between the second end of said column and said second element, means to introduce samples of fluid to be analyzed into said first conduit between said first element and said column, a bridge network having said first and second elements included in adjacent arms thereof, a first voltage source applied across first opposite terminals of said bridge network, voltage indicating means including an arm adapted to be deflected in accordance with the voltage to be measured, means connecting said voltage indicating means across second opposite terminals of said bridge network, said bridge network including a third variable impedance element, a shaded-pole reversible motor having first and second coils, an alternating voltage source, switching means to apply said alternating voltage source selectively across said first coil, means responsive to deflection of said arm in a first direction from a reference point to connect the center of said second coil to the first end thereof, means responsive to deflection of said arm in a second direction from said reference point to connect the center of said second coil to the second end thereof, means connecting the drive shaft of said motor to said third variable impedance element to adjust same in response to rotation of said motor and timing means to control said switching means and said means to introduce samples so that said alternating voltage source is applied across said first coil prior to the time constituents of the sample fluid are eluted from said column and said alternating voltage source is thereafter removed from said first coil prior to the time constituents of the sample fluid are eluted from said column.

6. Analysis apparatus comprising a chromatographic column, first conduit means communicating with one end of said column to introduce a carrier gas, a first temperature sensitive impedance element disposed in said first conduit means, a second temperature sensitive impedance element, second conduit means communicating between the second end of said column and said second element, means to introduce samples of fluid to be analyzed into said carrier gas downstream of said first element, a bridge network having said first and second elements included in adjacent arms thereof, a first voltage source applied across first opposite terminals of said bridge network, voltage indicating means including an arm adapted to be deflected in accordance with the voltage to be measured, means connecting said voltage indicating means across second opposite terminals of said bridge network, said bridge network including a third variable impedance element, a shaded-pole reversible motor having first and second coils, an alternating voltage source, switching means to apply said alternating voltage source selectively across said first coil, first and second spaced terminals connected to the respective ends of said second coil, a switch positioned adjacent said terminals and connected to the center of said second coil, means connecting said switch to said arm so that said switch engages said first terminal when said arm is deflected from a reference point in a first direction and engages said second terminal when said arm is deflected from said reference point in a second direction, means connecting the drive shaft of said motor to said third variable impedance element to adjust same in response to rotation of said motor and timing means to control said switching means and said means to introduce samples so that said alternating voltage source is applied across said first coil prior to the time constituents of the sample fluid are eluted from said column and said alternating voltage source is thereafter removed from said first coil prior to the time constituents of the sample fluid are eluted from said column.

7. Analysis apparatus comprising a chromatographic column, first conduit means communicating with one end of said column to introduce a carrier gas, a first temperature sensitive impedance element disposed in said first conduit means, a second temperature sensitive impedance element, second conduit means communicating between the second end of said column and said second element, third conduit means communicating with said one end of said column to introduce samples of fluid to be analyzed, a valve in said third conduit means, a first voltage source, means connecting first terminals of said first and second impedance elements to the first terminal of said first voltage source, a first potentiometer, means connecting the first end terminal of said first potentiometer to the second end terminal of said first impedance element, a second potentiometer, means connecting the first end terminal of said second potentiometer to the second terminal of said second impedance element, means connecting the second end terminals of said first and second potentiometers to the second terminal of said first voltage source, a third potentiometer having the end terminals connected to the contactors of said first and second potentiometers, respectively, voltage indicating means including an arm adapted to be deflected in accordance with the voltage to be measured, a shaded-pole reversible motor having first and second coils, an alternating voltage source, means responsive to deflection of said arm in a first direction from a reference point to connect the center of said second coil to the first end thereof, means responsive to deflection of said arm in a second direction from said reference point to connect the center of said second coil to the second end thereof, means connecting the drive shaft of said motor to the contactor of said first potentiometer, and timing means to open said valve for a preselected period of time, to connect said alternating voltage source across said first coil and to connect said voltage indicating means between the contactors of said first and second potentiometers, and thereafter to remove said alternating voltage source from said second coil and to connect said voltage indicating means between the contactors of said first and third potentiometers.

8. Analysis apparatus comprising a chromatographic column, first conduit means communicating with one end of said column to introduce a carrier gas, a first temperature sensitive impedance element disposed in said first conduit means, a second temperature sensitive impedance element, second conduit means communicating between the second end of said column and said second element, third conduit means communicating with said one end of said column to introduce samples of fluid to be analyzed, a valve in said third conduit means; first, second, third and fourth bridge terminals; a first voltage source; means connecting first terminals of said first and second impedance elements to said first bridge terminal; first, second, and third potentiometers; means connecting the second terminal of said first impedance element, said first, second and third potentiometers, and the second terminal of said second impedance element in series; means connecting the contactors of said first, second, and third potentiometers to said second, third, and fourth bridge terminals, respectively; a fourth potentiometer connected between said second and fourth bridge terminals; a voltage indicating means including an arm adapted to be deflected in accordance with the voltage to be measured; a first switch having a first contact and a switch arm; a second switch having first and second contacts and a switch arm; means connecting said voltage indicating means in series between said fourth bridge terminal and said switch arm of said first switch; means connecting said first contact of said first switch to said switch arm of said second switch; means connecting said first contact of said second switch to said second bridge terminal; means connecting said second contact of said second switch to the contactor of said fourth potentiometer; a shaded-pole reversible motor having first and second coils; an alternating voltage source; means responsive to deflection of said arm in a first direction from a reference point to connect the center of said second coil to the first end thereof, means responsive to deflection of said arm in a second direction from said reference point to connect the center of said second coil to the second end thereof;

means connecting the drive shaft of said motor to the contactor of said first potentiometer; and timing means to: connect said alternating voltage source across said first coil, connect said switch arm of said first switch to said first contact of said first switch, and connect said switch arm of said second switch to said first contact of said second switch for a first predetermined time to apply the full output signal from the bridge network to said voltage indicating means to initially zero said bridge network; to operate said valve during a second predetermined time to introduce a predetermined volume of the sample into said column; and to deenergize said first coil during a third predetermined time to prevent movement of said contactor of said first potentiometer; whereby said contactor on said second potentiometer can be adjusted until there is equal flow of current through said first and second impedance elements to thereby provide equal aging effects of said first and second impedance elements.

9. An electrical bridge measuring network comprising; first, second, third and fourth bridge terminals; a first voltage source; first and second impedance elements whose impedances are functions of a variable to be measured; means connecting first terminals of said first and second impedance elements to said first bridge terminal; first, second, and third potentiometers; means connecting the second terminal of said first impedance element, said first, second, and third potentiometers, and the second terminal of said second impedance element in series; means connecting the contactors of said first, second, and third potentiometers to said second, third, and fourth bridge terminals, respectively; a fourth potentiometer connected between said second and fourth bridge terminals; a voltage indicating means including an arm adapted to be deflected in accordance with the voltage to be measured; a first switch having a first contact and a switch arm; a second switch having first and second contacts and a switch arm; means connecting said voltage indicating means in series between said fourth bridge terminal and said switch arm of said first switch; means connecting said first contact of said first switch to said switch arm of said second switch; means connecting said first contact of said second switch to said second bridge terminal; means connecting said second contact of said second switch to the contactor of said fourth potentiometer; a shaded-pole reversible motor having first and second coils; an alternating voltage source; means responsive to deflection of said arm in a first direction from a reference point to connect the center of said second coil to the first end thereof, means responsive to deflection of said arm in a second direction from said reference point to connect the center of said second coil to the second end thereof; means connecting the drive shaft of said motor to the contactor of said first potentiometer; and timing means to: connect said alternating voltage source across said first coil, connect said switch arm of said first switch to said first contact of said first switch, and connect said switch arm of said second switch to said first contact of said second switch for a first predetermined time to apply the full output signal from the bridge network to said voltage indicating means to initially zero said bridge network; and to deenergize said first coil during a second predetermined time to prevent movement of said contactor of said first potentiometer; whereby said contactor on said second potentiometer can be adjusted until there is equal flow of current through said first and second impedance elements to thereby provide equal aging effects of said first and second impedance elements.

10. An electrical bridge measuring network comprising first, second, third and fourth bridge terminals; a first voltage source; first and second impedance elements whose impedances are functions of a variable to be measured; means connecting first terminals of said first and second impedance elements to said first bridge terminal; first, second, and third potentiometers; means connecting the second terminal of said first impedance element, said first, second, and third potentiometers, and the second terminal of said second impedance element in series; means connecting the contactors of said first, second, and third potentiometers to said second, third, and fourth bridge terminals, respectively; a fourth potentiometer connected between said second and fourth bridge terminals; a voltage indicating means including an arm adapted to be deflected in accordance with the voltage to be measured; a first switch having first and second contacts and a switch arm; means connecting said voltage indicating means in series between said fourth bridge terminal and said switch arm of said first switch; means connecting said first contact of said first switch to said second bridge terminal; means connecting said second contact of said first switch to the contact of said fourth potentiometer; a shaded-pole reversible motor having first and second coils; an alternating voltage source; means responsive to deflection of said arm in a first direction from a reference point to connect the center of said second coil to the first end thereof, means responsive to deflection of said arm in a second direction from said reference point to connect the center of said second coil to the second end thereof; means connecting the drive shaft of said motor to the contactor of said first potentiometer; and timing means to connect said alternating voltage source across said first coil, and connect said switch arm of said first switch to said first contact of said first switch for a first predetermined time to apply the full output signal from the bridge network to said voltage indicating means to initially zero said bridge network; whereby said contactor on said second potentiometer can be adjusted until there is equal flow of current through said first and second impedance elements to thereby provide equal aging effects of said first and second impedance elements.

References Cited in the file of this patent

UNITED STATES PATENTS

| | | |
|---|---|---|
| 1,573,850 | Naiman | Feb. 23, 1926 |
| 2,000,119 | Brown et al. | May 7, 1935 |
| 2,310,955 | Hornfeck | Feb. 16, 1943 |
| 2,529,450 | Hornfeck | Nov. 7, 1950 |
| 2,875,606 | Robinson | Mar. 3, 1959 |